United States Patent
Fukagawa et al.

(10) Patent No.: US 6,743,842 B1
(45) Date of Patent: Jun. 1, 2004

(54) FLUORINE-CONTAINING RESIN POWDER COATING COMPOSITION

(75) Inventors: Ryoichi Fukagawa, Settsu (JP); Nobuhiko Tsuda, Settsu (JP); Masaru Nagato, Settsu (JP); Go Nagai, Settsu (JP); Ryuji Iwakiri, deceased, late of Settsu (JP), by Miyuki Iwakiri, legal representative

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/868,071

(22) PCT Filed: Dec. 13, 1999

(86) PCT No.: PCT/JP99/06982

§ 371 (c)(1), (2), (4) Date: Jun. 14, 2001

(87) PCT Pub. No.: WO00/36027

PCT Pub. Date: Jun. 22, 2000

(30) Foreign Application Priority Data

Dec. 16, 1998 (JP) ............................................. 10-358019

(51) Int. Cl.$^7$ ................................................. C08K 5/24
(52) U.S. Cl. ........................ 524/261; 524/544; 524/545; 524/546
(58) Field of Search ................................. 524/261, 544, 524/545, 546

(56) References Cited

U.S. PATENT DOCUMENTS

| 5,043,393 A | * | 8/1991 | Honma et al. | ............ 525/326.3 |
|---|---|---|---|---|
| 5,635,548 A | * | 6/1997 | Kittle et al. | ................. 523/220 |
| 5,726,225 A | * | 3/1998 | Braig et al. | .................... 524/83 |
| 5,895,713 A | * | 4/1999 | Miyazaki et al. | ........... 428/335 |
| 6,271,293 B1 | * | 8/2001 | Karuga et al. | .............. 524/265 |

FOREIGN PATENT DOCUMENTS

| JP | 4-65418 | 3/1992 |
|---|---|---|
| JP | 06-279709 | * 10/1994 |
| JP | 07053910 A | 2/1995 |
| JP | 08073777 A | 3/1996 |
| JP | 10-140047 | 5/1998 |
| JP | 10-147739 | 6/1998 |
| JP | 10-237364 | 9/1998 |
| WO | WO 94/06870 | 3/1994 |

OTHER PUBLICATIONS

Supplementary European Search Report for EP 99 95 9781 dated May 24, 2002.

International Search Report for PCT/JP99/06982 dated Mar. 7, 2000.

English translation of International Preliminary Examination Report for PCT/JP99/06982 dated Jan. 24, 2001.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

To provide a powder coating composition which comprises 100 parts by weight of fluorine-containing resin and 1 to 40 parts by weight of tetrafunctional or trifunctional silicate compound or a condensation product thereof, has a function of removing electrostatic charge and gives a coating film having a high hardness and stain-proof property.

6 Claims, No Drawings

FLUORINE-CONTAINING RESIN POWDER COATING COMPOSITION

TECHNICAL FIELD

The present invention relates to a fluorine-containing resin powder coating composition, particularly a fluorine-containing resin powder coating composition having excellent antistatic property and stain-proofing property.

BACKGROUND ART

Fluorine-containing resins are excellent in water repellency, oil repellency, heat resistance, weather resistance and chemical resistance and are used as various resins for coating.

Also powder coating compositions comprising a fluorine-containing resin are known. For example, JP-B-6-104792 describes a powder coating composition mainly comprising chlorotrifluoroethylene (CTFE)/tetrafluoroethylene (TFE) copolymer. Also JP-A-4-227743 describes a thermoplastic powder coating composition comprising a vinylidene fluoride (VdF)/hexafluoropropylene (HFP) copolymer and a thermoplastic acrylic resin, and JP-A-6-108103 describes a powder coating composition comprising polyvinylidene fluoride (PVdF), a thermoplastic resin and a VdF/tetrafluoroethylene (TFE)/HFP terpolymer. Further it is proposed in JP-A-1-103670 that a copolymer mainly comprising chlorotrifluoroethylene (CTFE) or TFE is used solely as a resin component in a thermosetting powder coating composition. Also JP-A-6-279549 proposes to use a copolymer of VdF and allyl derivative solely as a resin component.

Coating films formed by using those fluorine-containing resin powder coating compositions have problems that lipophilic stain is easily adhered thereto due to excellent water repellency of the fluorine-containing resin and is difficult to be removed. Further fluorine-containing resins are relatively soft and a surface thereof is easily damaged.

A powder coating is generally prepared by mixing a resin and other components such as a pigment and curing agent, and after once melt-kneaded, pulverized and classified with a sieve. However since a fluorine-containing resin has a high insulating property and is easily charged, when classifying after the pulverization, adhesion to walls of a vessel and sparking occur. Thus handling thereof is not good. Further since there arise a difference in charge amount at electrostatic coating, it is difficult to coat thick.

DISCLOSURE OF INVENTION

The present invention relates to a fluorine-containing resin powder coating composition which gives a property of a stain hardly adhering to a formed coating film (stain-proofing property) and is excellent in a property (electric-charge removability) of preventing accumulation of electric charge which becomes a problem when preparing a powder coating composition.

Namely the present invention relates to the powder coating composition comprising a fluorine-containing resin (A) and a silicate component (B).

As the silicate component (B), there is used at least one selected from a tetrafunctional silicate compound represented by the formula (I): $Si(OR)_4$, wherein R is the same or different and each is an organic group having 1 to 16 carbon atoms, preferably 1 to 8 carbon atoms, or a condensation product thereof;

a trifunctional silicate compound represented by the formula (II): $R^2Si(OR^1)_3$, wherein $R^1$ is the same or different and each is an organic group having 1 to 16 carbon atoms, preferably 1 to 8 carbon atoms, $R^2$ is hydrogen atom or an organic group having 1 to 16 carbon atoms, preferably 1 to 8 carbon atoms, or a condensation product thereof; and a co-condensation product of the tetrafunctional silicate compound of the formula (I) and the trifunctional silicate compound of the formula (II).

An adding amount of the silicate component (B) is from 1 to 40 parts by weight (hereinafter referred to as "part"), preferably 5 to 15 parts based on 100 parts of the fluorine-containing resin (A). When the amount of the silicate component (B) is less than 1 part, not only an effect of preventing adhesion of stain of the obtained coating composition but also an effect of preventing electrostatic charge thereof are lowered. When more than 40 parts, storage stability of the coating composition is lowered.

The silicate component (B) prevents an excessive electrostatic charge of the fluorine-containing resin and makes an improvement in handling of the powder and coatability at electrostatic coating. Further a surface of the coating film is made hydrophilic by hydrolysis to exhibit functions of preventing stain from adhering, making removal of stain easy and enhancing a hardness of the coating film by condensation.

It is known that a silicate compound is added to a coating composition (JP-A-10-11078, WO944/06870, etc.). However an object of the addition is mainly to improve stain-proofing property and weather resistance of a solvent based coating and aqueous coating, and there is no description as to the above-mentioned specific problem of a powder coating composition (electrostatic charge, hardness of a coating film, etc.).

An object of the present invention is to select a silicate compound suitable for a powder coating composition among silicate compounds known as a stain-proofing agent and solve the specific problem of a powder coating composition.

BEST MODE FOR CARRYING OUT THE INVENTION

The fluorine-containing resin powder coating composition of the present invention comprises the fluorine-containing resin (A) and the silicate component (B) as mentioned above.

Examples of the fluorine-containing resin (A) are, for instance, a tetrafluoroethylene (TFE) copolymer, vinylidene fluoride (VdF) copolymer, chlorotrifluoroethylene (CTFE) copolymer, and the like.

Examples of the TFE copolymer are those mainly comprising TFE and prepared by copolymerizing one or two or more of other monomers, for example, hexafluoropropylene (HFP), ethylene (ET), isobutylene (IB) and propylene (PR). Concretely there are a TFE/HFP/ET copolymer (THE), TFE/HFP/IB copolymer (THI), TFE/ET/PR copolymer (TEP), and the like. Particularly from the viewpoint of pulverizability and storage stability, THE and THI are preferable.

Examples of the VdF copolymer are those mainly comprising VdF and prepared by copolymerizing one or two or more of other monomers such as TFE, trifluoroethylene (TrFE), chlorotrifluoroethylene (CTFE), HFP and monofluoroethylene (VF). Concretely there are a VdF/TFE copolymer, VdF/TFE/HFP copolymer, VdF/TFE/CTFE copolymer, VdF/TrFE copolymer, VdF/VF copolymer, and the like. Particularly from the viewpoint of pulverizability and storage stability, VdF/TFE copolymer and VdF/TFE/HFP copolymer are preferable.

Also examples of the CTFE copolymer are those mainly comprising CTFE and prepared by copolymerizing one or two or more of other monomers such as TFE, ethyl vinyl ether (EVE), isobutyl vinyl ether (iso-BVE) and vinyl acetate (VA). Concretely there are a CTFE/TFE copolymer, CTFE/EVE copolymer, CTFE/iso-BVE copolymer, CTFE/TFE/iso-BVE/VA copolymer, and the like.

In the present invention, a thermosetting powder coating composition can be provided by introducing a crosslinkable functional group into the fluorine-containing resin (A).

Examples of preferable crosslinkable functional group are, for instance, functional groups represented by the following group of formulae (i):

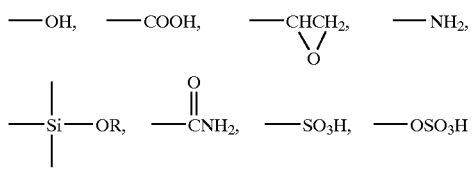

wherein R is an alkyl group having 1 to 3 carbon atoms.

Among the above-mentioned functional groups, the following group of formulae (ii) is preferable.

Examples of monomers being capable of introducing such a crosslinkable functional group are, for instance, perfluorobutenoic acid (PFBA), fluorine-containing monomers having an ether unit described in JP-A-8-67795, and in addition, non-fluorine-containing monomers having carboxylic acid group such as meleic anhydride (MAL); hydroxyl group-containing monomers such as hydroxybutyl vinyl ether (HBVE) and allyl alcohol; epoxy group-containing monomers such as glycidyl vinyl ether (GVE); vinyl methoxy silane, vinyl ethoxy silane and hydrolyzable silyl group-containing monomers described in JP-A-8-120211, monomers having aminopropoxy group, and the like.

Among them, PFBA, carboxyl group-containing monomers such as maleic anhydride, hydroxyl group-containing monomers such as HBVE and epoxy (glycidyl) group-containing monomers such as GVE are preferable from the viewpoint of reactivity in a baking temperature range in case of combination with a known curing agent.

The crosslinkable functional group is used to form a curing site. Though its amount varies depending on reactivity of the functional group and kind of the curing agent, it is preferable that an acid value is from 1 to 300 mgKOH/g, a hydroxyl value is from 1 to 200 mgKOH/g or an epoxy equivalent is from 5 to 15,000 equivalents based on the whole resin components in the coating composition.

Examples of the TFE copolymer having crosslinkable functional group are those having a melting point of not more than 160° C. and a melt flow rate (MFR) of from 1 to 1,000 g/10 min (130° C., 2.1 kg of load). Examples thereof are, for instance, TFE/HFP/ET/PFBA copolymer (25 to 40/10 to 20/35 to 48/0.1 to 10 in mole ratio), TFE/HFP/ET/HBVE copolymer (25 to 40/10 to 20/35 to 48/0.1 to 10 in mole ratio), TFE/HFP/ET/GVE copolymer (25 to 40/10 to 20/35 to 48/0.1 to 10 in mole ratio), TFE/HFP/IB/HBVE copolymer (25 to 40/10 to 20/35 to 48/0.1 to 10 in mole ratio), TFE/HFP/ET/HBVE/vinyl benzoate (VBz) copolymer (25 to 40/10 to 20/35 to 48/0.1 to 10/3 to 8 in mole ratio), TFE/HFP/ET/HBVE/VBz/vinyl pivalate (VPi) copolymer (25 to 40/10 to 20/35 to 48/0.1 to 10/3 to 8/3 to 8 in mole ratio), and the like.

Also examples of the preferable VdF copolymers having crosslinkable functional group are those having a molecular weight of from 1,000 to 100,000 (converted based on styrene with GPC), a melting point of not more than 150° C. (measured with DSC), a glass transition temperature of not more than 150° C. (measured with DSC) and a melt flow rate (MFR) of from 1.0 to 1,000 g/10 min (130° C., 2.1 kg of load). Examples thereof are, for instance, VdF/TFE/PFBA copolymer (65 to 95/5 to 25/1 to 10 in mole ratio), VdF/TFE/HFP/PFBA copolymer (50 to 95/5 to 20/5 to 20/1 to 10 in mole ratio), and the like.

Examples of the preferable CTFE copolymers having crosslinkable functional group are those having a molecular weight of from 1,000 to 100,000 and a glass transition temperature of from 30° to 120° C. For instance, CTFE/TFE/iso-BVE/HBVE copolymer (30 to 60/5 to 30/5 to 20/5 to 30 in mole ratio), and the like are suitable.

The fluorine-containing resin (A) to be used in the present invention can have various fluorine-contents by selecting a copolymerizable component depending on characteristics required on a coating film. The fluorine-content is preferably not less than 10% by weight (hereinafter referred to as "%"), particularly not less than 30%, further not less than 50% from the viewpoint of giving a coating film having excellent weather resistance and water resistance.

In the following case, it is preferable that a resin which does not dissolve substantially in tetrahydrofuran (THF) is used as the fluorine-containing resin (A).

Not dissolving in THF means that a compatibility with a resin dissolving in THF is inferior. Namely, after coating with a powder coating composition prepared by using the resin dissolving in THF, when the powder coating composition of the present invention is coated on the same coating line, or in a reverse case, the fluorine-containing resin (A) is less affected by other resin and also an effect of mixing of the fluorine-containing resin (A) on other powder coating composition can be reduced.

The meaning of not dissolving substantially encompasses a case of dissolving in THF in a concentration of less than 0.5%. This is because when an intrinsic viscosity ($\eta$) of the resin in the THF solution is measured substantially, a reliable intrinsic viscosity ($\eta$) cannot be measured unless a solubility is about 0.5% or more.

Examples of fluorine-containing resin which does not dissolve in THF substantially are the above-mentioned TFE copolymers such as THE, THI and TEP or copolymers thereof having crosslinkable functional group. Among the resins dissolving in THF, examples of the resins used for a powder coating composition are, for instance, an acrylic resin, polyester resin, epoxy resin, the above-mentioned VdF copolymers, fluorine-containing resins described in JP-B-6-104792, and the like.

In addition to the fluorine-containing resin (A), other synthetic resin can be blended as a resin component of the present invention. An adding amount of the other synthetic resin may be optionally selected depending on kind of the resin and application of a coating. It is a matter of course that the amount is one not lowering characteristics of the fluorine-containing resin. The amount is usually from 20 to 150 parts based on 100 parts of the fluorine-containing resin (A).

Examples of the other synthetic resin are, for instance, an acrylic resin, polyester resin, epoxy resin, fluorine-containing resin comprising components different from those of the fluorine-containing resin (A), and the like.

Particularly when the fluorine-containing resin (A) is the above-mentioned VdF copolymer, particularly the VdF copolymer having crosslinkable functional group, it is preferable to use a composite resin prepared by using methyl methacrylate (MMA) polymer as the other synthetic resin from the viewpoint of good pulverizability at room temperature and from the point that crack resistance at bending a cured coating film and shock resistance are improved.

MMA polymer itself gives excellent appearance such as a gloss and smoothness, hardness and transparency at clear coating to a surface of the obtained coating film and improves pigment dispersibility and adhesion to a substrate.

MMA polymer which can be used in the present invention may be a MMA homopolymer or a copolymer comprising MMA as an essential component and a monomer copolymerizable therewith. Examples of the copolymerizable monomer are, for instance, one or two or more of acrylate monomers and methacrylate monomers.

While MMA polymer may have no crosslinkable functional group, the above-mentioned crosslinkable functional group raised with respect to VdF polymer may be introduced to give a crosslinkable MMA polymer.

Examples of the monomer having such a crosslinkable functional group are, for instance, unsaturated carboxylic acids such as acrylic acid, methacrylic acid, maleic acid and crotonic acid as the monomer having carboxylic acid group; 2-hydroxyethyl acrylate, hydroxyethyl acrylate, hydroxyethyl methacrylate, hydroxypropyl acrylate, hydroxypropyl methacrylate and ethylene glycol dimethacrylate as the monomer having hydroxyl group; glycidyl acrylate and glycidyl methacrylate (GMA) as the monomer having epoxy group; and the like.

A content of the MMA unit in the MMA polymer is not less than 70% by mole, preferably 90 to 100% by mole from the point that a compatibility with the above-mentioned VdF copolymer is good and a gloss of the obtained coating film is hardly lowered.

When the above-mentioned monomer having crosslinkable functional group is copolymerized in the MMA polymer, a content of the monomer unit is not limited particularly as far as when a composite resin is prepared by using a VdF resin, an acid value is from 1 to 300 mgKOH/g, a hydroxyl value is from 1 to 200 mgKOH/g or an epoxy equivalent is in a range of from 5 to 15,000 equivalents based on the whole composite resin. From the point that when excessive functional groups are introduced, a compatibility with the VdF copolymer is lowered, it is preferable that the copolymerization is carried out so that the MMA unit is contained in an amount of not less than 70% by mole, more preferably not less than 80% by mole. From the above-mentioned point of view, the monomer having functional group is copolymerized in an amount of preferably from 0.1 to 30% by mole, more preferably 1 to 20% by mole.

When a composite resin is prepared by using a VdF copolymer, a glass transition temperature (Tg) of the MMA polymer is not limited particularly as far as it is in a range of from 30° to 120° C. For the same reason as mentioned above, it is preferable that the MMA unit is copolymerized so as to be contained in an amount of not less than 70% by mole, more preferably not less than 80% by mole.

It is preferable that a number average molecular weight of the MMA polymer is $1\times10^3$ to $1\times10^5$ from the point that post-processability is hardly lowered and an appearance of a coating film is hardly lowered.

The MMA polymer can be prepared by usual methods such as emulsion polymerization, suspension polymerization, solution polymerization and bulk polymerization.

With respect to a mixing amount of the above-mentioned VdF copolymer and MMA polymer, an amount of the MMA polymer is from 10 to 400 parts, preferably 20 to 250 parts on the basis of 100 parts of the VdF copolymer. By employing this mixing amount, an effect of improvement in adhesion of the obtained powder coating composition to a substrate, bending resistance, and a gloss, weather resistance, water resistance and chemical resistance of a coating film obtained from the composition is increased.

When a resin for powder coating is hard and fragile at room temperature (0 to about 40° C.), it can be finely pulverized at room temperature, but a resin having Tg around room temperature has elasticity and cannot be finely pulverized at room temperature and therefore is solidified at a very low temperature (about −150° C. to about −50° C.) and then pulverized. However conventional VdF resin which is finely pulverizable at room temperature has to be hard and fragile around room temperature, and therefore crack resistance at bending of the obtained coating film and shock resistance thereof are inferior.

The above-mentioned composite resin of VdF copolymer and MMA polymer is finely pulverizable at room temperature, and crack resistance at bending of the obtained coating film and shock resistance thereof are improved.

A finely pulverizing method to be employed suitably is, for example, an impact pulverization method, and a preferable pulverizing equipment is, for example, a hammer mill, or the like.

With respect to another feature of the above-mentioned composite resin of the present invention and the powder thereof, for example, the resin and powder having the following characteristics are preferable.

Tg: Tg is preferably from 30° to 100° C., particularly 500 to 70° C. from the viewpoint of pulverizability around room temperature, hardness of a coating film at a temperature at use and forming of film by heat-melting. Apparent specific gravity: The apparent specific gravity is preferably from 0.1 to 1.0 g/cc, particularly 0.2 to 0.7 g/cc from the viewpoint of miscibility with a pigment and additives for coating at dry-blending.

Then the silicate component (B) is explained below. The silicate component (B) to be used in the present invention is a tetrafunctional silicate compound (I) represented by the above-mentioned formula (I) or its condensation product (including a co-condensation product of tetrafunctional silicate compounds), a trifunctional silicate compound (II) represented by the formula (II) or its condensation product (including a co-condensation product of trifunctional silicate compounds), a co-condensation product of the tetrafunctional silicate compound (I) and trifunctional silicate compound (II) or a mixture thereof.

The silicate component (B) has a function of preventing electrostatic charge (removal of charge) attributable to the fluorine-containing resin (A) at the time when mixed to the fluorine-containing resin (A), melted and then re-pulverized to be formed into a powder. Also the silicate component (B) gathers around a surface of a coating film when the coating film is baked, and after the coating film is formed, hydrolysis is caused due to water in the air and rain to make the surface of the coating film hydrophilic. Thus the silicate component (B) has a function of preventing adherence of stain and making it easy to remove adhered stain. Further the silicate component (B) is condensed due to water in the air or rain to form a coating film having a high hardness and increase a hardness of the coating film. Also the silicate component (B) makes it possible to coat thick at electrostatic coating.

Also when the fluorine-containing resin (A) and/or other synthetic resin has a crosslinkable functional group, the silicate component (B) reacts with the functional group to form a strong crosslinked structure and thus increase a hardness of the coating film.

The organic group R of alkoxyl group (—OR) of the tetrafunctional silicate compound (I) is a linear or branched organic group having 1 to 16, preferably 1 to 8 carbon atoms.

The organic group R may have oxygen atom, nitrogen atom and/or silicon atom. From the viewpoint of surface concentrating property, the organic group having fluorine atom or non-hydrolyzable group-containing silicon atom is preferable, and a group having trifluoromethyl group or a group having dimethylsiloxane chain is further preferable.

Also a part of hydrogen atoms of the organic group R may be replaced with fluorine atoms, which has a tendency of causing a highly concentrated surface.

Also a part of hydrogen atoms of the organic group may be replaced with fluorine atoms and chlorine atoms, which has a tendency of making a solubility high.

Among the above-mentioned R, a hydrocarbon group having 1 to 8 carbon atoms, and the like are preferable as an organic group having no fluorine atom. Examples thereof are, for instance, $CH_3$, $C_2H_5$, $CH_3CH_2CH_2$, $(CH_3)_2CH$, $CH_3(CH_2)_2CH_2$, $CH_3CH_2CH_2CH_2CH(C_2H_5)CH_2$, a group having a dimethylsiloxane chain, and the like. From the viewpoint of hydrolyzability, releasing property, availability and workability, $CH_3$ and $C_2H_5$ are preferable and $CH_3$ is more preferable.

Among the groups R, the organic groups having fluorine atom are groups having the above-mentioned surface concentrating property. Examples thereof are, for instance, $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_mCF(CF_3)C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_mC(=O)NR^3$, $H(CF_2)_n(CH_2)_mC(=O)NR^3$, $F(CF_2)_n(CH_2)_mC=CH_2$, $H(CF_2)_n(CH_2)_mC=CH_2$, $F(CF_2)_n(CH_2)_m C=CF_2$ and $H(CF_2)_n(CH_2)_mC=CF_2$, wherein m and n are integers selected so that the number of carbon atoms of the organic group does not exceed 16, $R^3$ is alkyl having 1 to 6 carbon atoms, the organic group having fluorine atom may be branched.

Examples of those organic groups are, for instance, $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, $CF_3(CF_2)_7C=O$, and the like. From the viewpoint of surface concentrating property, hydrolyzability and releasing property, $CF_3CH_2$, $CF_3CF_2CH_2$, $CF_3(CF_2)_2CH_2$, $CF_3(CF_2)_3CH_2CH_2$, $CF_3C=O$ and $CF_3CF_2C=O$ are preferred, and $CF_3CH_2$ and $CF_3CF_2CH_2$ are more preferable.

Examples of the tetrafunctional silicate compound (I) are, for instance, as follows.

$Si(OCH_2CF_2CF_3)_4$, $Si(OCH(CF_3)_2)_4$, $Si(OCH_2CH_2C_8F_{17})_4$, $Si(OCH_2CF_2CF_2H)_4$, $Si(OCH_2C_4F_8H)_4$, $Si(OCH_2CF_2CF_3)_2(OCH_3)_2$,
$Si(OCH(CF_3)_2)_2(OCH_3)_2$, $Si(OCH_2CH_2C_8F_{17})_2(OCH_3)_2$,
$Si(OCH_2CF_2CF_2H)_2(OCH_3)_2$, $Si(OCH_2CF_2CH_2H)_2(OC_4H_9)_2$,
$Si(OCH_2CF_2CF_3)_2(OH)_2$, $Si(OCH(CF_3)_2)_2(OH)_2$,
$Si(OCH_2CH_2C_8F_{17})_2(OH)_2$, $Si(OCH_2CF_2CF_2H)_2(ON=CCH_3(C_2H_5))_2$,
$Si(OCOCF_3)_4$, $Si(OCOC_2F_5)_4$, $Si(OCOC_8F_{17})_4$,
$Si(OCOCF_3)_2(OCH_3)_2$, $Si(OCOC_2F_5)_2(OCH_3)_2$,
$Si(OCOC_8F_{17})_2(OCH_3)_2$, $Si(OCH_2CF_2CF_3)_3(OCH_2CH_2)_hOCH_3$,
$Si(OCH(CF_3)_2)_3(OCH_2CH_2)_hOCH_3$,
$Si(OCH_2CH_2C_8F_{17})_3(OCH_2CH_2)_hOCH_3$,
$Si(OCH_2CF_2CF_3)_2(OCH_3)(OCH_2CH_2)_hOCH_3$,
$Si(OCH(CF_3)_2)_2(OCH_3)(OCH_2CH_2)_hOCH_3$,
$Si(OCH_2CH_2C_8F_{17})_2(OCH_3)(OCH_2CH_2)_hOCH_3$,
$Si(OCH_2CF_2CF_3)_2(OH)(OCH_2CH_2)_hOCH_3$,
$Si(OCH(CF_3)_2)_2(OH)(OCH_2CH_2)_hOCH_3$,
$Si(OCH_2CH_2C_8F_{17})_2(OH)(OCH_2CH_2)_hOCH_3$,
$Si(OCOCF_3)_3(OCH_2CH_2)_hOCH_3$, $Si(OCOC_2F_5)_3(OCH_2CH_2)_hOCH_3$,
$Si(OCOC_8F_{17})_3(OCH_2CH_2)_hOCH_3$,
$Si(OCOCF_3)_2(OCH_3)(OCH_2CH_2)_hOCH_3$,
$Si(OCOC_2F_5)_2(OCH_3)(OCH_2CH_2)_hOCH_3$,
$Si(OCH_2CH_2C_8F_{17})_2(OCH_3)(OCH_2CH_2)_hOCH_3$,
$Si(OCH_3)_4$, $Si(OC_2H_5)_4$, $Si(OC_4H_9)_4$ and $Si(ON=CCH_3(C_2H_5))_4$, wherein h is an integer of 1 to 6.

Also the trifunctional silicate compound (II) represented by the formula (II) and its condensation product (including a co-condensation product of trifunctional silicate compounds) can be used as the silicate component (B) of the present invention.

In the formula (II), $R^1$ is a linear or branched organic group having 1 to 16 carbon atoms, preferably 1 to 8 carbon atoms, and $R^2$ is hydrogen atom or a linear or branched organic group having 1 to 16 carbon atoms, preferably 1 to 8 carbon atoms. Examples of those organic groups ($R^1$ and $R^2$) which can be used are the groups described with respect to the organic group R in the formula (I).

Examples of the preferable trifunctional silicate compound (II) are, for instance, as follows.

$HSi(OCH_2CF_3)_3$, $HSi(OCH_2CF_2CF_3)_3$, $HSi(OCH(CF_3)_2)_3$,
$HSi(OCH_2CH_2C_8F_{17})_3$, $HSi(OCH_2CF_2CF_3)_2(OCH_3)$,
$HSi(OCH(CF_3)_2)_2(OCH_3)$, $HSi(OCH_2CH_2C_8F_{17})_2(OCH_3)$,
$HSi(OCOCF_3)_3$,
$HSi(OCOC_2F_5)_3$, $HSi(OCOC_8F_{17})_3$, $HSi(OCOCF_3)_2(OCH_3)$,
$HSi(OCOC_2F_5)_2(OCH_3)$, $HSi(OCOC_8F_{17})_2(OCH_3)$,
$CH_3Si(OCH_3)_3$, $CH_3Si(OCH_2CF_3)_3$,
$CH_3Si(OCH_2CF_2CF_3)_3$, $CH_3Si(OCH(CF_3)_2)_3$,
$CH_3Si(OCH_2CH_2C_8F_{17})_3$, $CH_3Si(OCH_2CF_2CF_3)_2(OCH_3)$,
$CH_3Si(OCH(CF_3)_2)_2(OCH_3)$, $CH_3Si(OCH_2CH_2C_8F_{17})_2(OCH_3)$,
$CH_3Si(OCOCF_3)_3$, $CH_3Si(OCOC_2F_5)_3$,
$CH_3Si(OCOC_8F_{17})_3$, $CH_3Si(OCOCF_3)_2(OCH_3)$,
$CH_3Si(OCOC_2F_5)_2(OCH_3)$, $CH_3Si(OCOC_8F_{17})_2(OCH_3)$,
$H_2N(CH_2)_3Si(OCH_2CF_3)_3$, $H_2N(CH_2)_3Si(OCH_2CF_2CF_3)_3$,
$H_2N(CH_2)_3Si(OCH(CF_3)_2)_3$, $H_2N(CH_2)_3Si(OCH_2CH_2C_8F_{17})_3$,
$H_2N(CH_2)_3Si(OCH_2CF_2CF_3)_2(OCH_3)$,
$H_2N(CH_2)_3Si(OCH(CF_3)_2)_2(OCH_3)$,
$H_2N(CH_2)_3Si(OCH_2CH_2C_8F_{17})_2(OCH_3)$,
$H_2N(CH_2)_3Si(OCOCF_3)_3$,
$H_2N(CH_2)_3Si(OCOC_2F_5)_3$, $H_2N(CH_2)_3Si(OCOC_8F_{17})_3$,
$H_2N(CH_2)_3Si(OCOCF_3)_2(OCH_3)$, $H_2N(CH_2)_3Si(OCOC_2F_5)_2(OCH_3)$,
$H_2N(CH_2)_3Si(OCOC_8F_{17})_2(OCH_3)$,
$OCN(CH_2)_3Si(OCH_2CF_3)_3$, $OCN(CH_2)_3Si(OCH_2CF_2CF_3)_3$,

OCN(CH$_2$)$_3$Si(OCH(CF$_3$)$_2$)$_3$,
OCN(CH$_2$)$_3$Si(OCH$_2$CH$_2$C$_8$F$_{17}$)$_3$,
OCN(CH$_2$)$_3$Si(OCH$_2$CF$_2$CF$_3$)$_2$(OCH$_3$),
OCN(CH$_2$)$_3$Si(OCH(CF$_3$)$_2$)$_2$(OCH$_3$),
OCN(CH$_2$)$_3$Si(OCH$_2$CH$_2$C$_8$F$_{17}$)$_2$(OCH$_3$), OCN(CH$_2$)$_3$Si(OCOCF$_3$)$_3$,
OCN(CH$_2$)$_3$Si(OCOC$_8$F$_{17}$)$_3$, OCN(CH$_2$)$_3$Si(OCOCF$_3$)$_2$(OCH$_3$),
OCN(CH$_2$)$_3$Si(OCOC$_2$F$_5$)$_2$(OCH$_3$), OCN(CH$_2$)$_3$Si(OCOC$_8$F$_{17}$)$_2$(OCH$_3$),
CH$_3$O(CH$_2$CH$_2$O)$_g$(CH$_2$)$_3$Si(OCH$_2$CF$_3$)$_3$,
CH$_3$O(CH$_2$CH$_2$O)$_g$(CH$_2$)$_3$Si(OCH$_2$CF$_2$CF$_3$)$_3$,
CH$_3$O(CH$_2$CH$_2$O)$_g$(CH$_2$)$_3$Si(OCH(CF$_3$)$_2$)$_3$,
CH$_3$O(CH$_2$CH$_2$O)$_g$(CH$_2$)$_3$Si(OCH$_2$CH$_2$C$_8$F$_{17}$)$_3$,
CH$_3$O(CH$_2$CH$_2$O)$_g$(CH$_2$)$_3$Si(OCH$_2$CF$_2$CF$_3$)$_2$(OCH$_3$),
CH$_3$O(CH$_2$CH$_2$O)$_g$(CH$_2$)$_3$Si(OCH(CF$_3$)$_2$)$_2$(OCH$_3$),
CH$_3$O(CH$_2$CH$_2$O)$_g$(CH$_2$)$_3$Si(OCH$_2$CH$_2$C$_8$F$_{17}$)$_2$(OCH$_3$),
CH$_3$O(CH$_2$CH$_2$O)$_g$(CH$_2$)$_3$Si(OCOCF$_3$)$_3$,
CH$_3$O(CH$_2$CH$_2$O)$_g$(CH$_2$)$_3$Si(OCOC$_2$F$_5$)$_3$,
CH$_3$O(CH$_2$CH$_2$O)$_g$(CH$_2$)$_3$Si(OCOC$_8$F$_{17}$)$_3$,
CH$_3$O(CH$_2$CH$_2$O)$_g$(CH$_2$)$_3$Si(OCOCF$_3$)$_2$(OCH$_3$),
CH$_3$O(CH$_2$CH$_2$O)$_g$(CH$_2$)$_3$Si(OCOC$_2$F$_5$)$_2$(OCH$_3$),
CH$_3$O(CH$_2$CH$_2$O)$_g$(CH$_2$)$_3$Si(OCOC$_8$F$_{17}$)$_2$(OCH$_3$),
wherein g is an integer of 1 to 6,
CH$_2$=C(CH$_3$)CO$_2$(CH$_2$)$_3$Si(OCH$_2$CF$_3$)$_3$,
CH$_2$=C(CH$_3$)CO$_2$(CH$_2$)$_3$Si(OCH$_2$CF$_2$CF$_3$)$_3$,
CH$_2$=C(CH$_3$)CO$_2$(CH$_2$)$_3$Si(OCH(CF$_3$)$_2$)$_3$,
CH$_2$=C(CH$_3$)CO$_2$(CH$_2$)$_3$Si(OCH$_2$CH$_2$C$_8$F$_{17}$)$_3$,
CH$_2$=C(CH$_3$)CO$_2$(CH$_2$)$_3$Si(OCH$_2$CF$_2$CF$_3$)$_2$(OCH$_3$),
CH$_2$=C(CH$_3$)CO$_2$(CH$_2$)$_3$Si(OCH(CF$_3$)$_2$)$_2$(OCH$_3$),
CH$_2$=C(CH$_3$)CO$_2$(CH$_2$)$_3$Si(OCH$_2$CH$_2$C$_8$F$_{17}$)$_2$(OCH$_3$),
CH$_2$=C(CH$_3$)CO$_2$(CH$_2$)$_3$Si(OCOCF$_3$)$_3$,
CH$_2$=C(CH$_3$)CO$_2$(CH$_2$)$_3$Si(OCOC$_2$F$_5$)$_3$,
CH$_2$=C(CH$_3$)CO$_2$(CH$_2$)$_3$Si(OCOC$_8$F$_{17}$)$_3$,
CH$_2$=C(CH$_3$)CO$_2$(CH$_2$)$_3$Si(OCOCF$_3$)$_2$(OCH$_3$),
CH$_2$=C(CH$_3$)CO$_2$(CH$_2$)$_3$Si(OCOC$_2$F$_5$)$_2$(OCH$_3$) and
CH$_2$=C(CH$_3$)CO$_2$(CH$_2$)$_3$Si(OCOC$_8$F$_{17}$)$_2$(OCH$_3$).

The condensation product and co-condensation product of the tetrafunctional silicate compound (I) can also be used as the silicate component (B). The (co-)condensation product is represented by the formula (III);

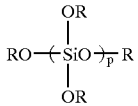

(III)

wherein R is as defined above, p is an integer of 2 or more.

The condensation product (III) which is industrially available is a mixture of compounds having a certain range of p, and p is represented by an average value.

Also the condensation product (III) encompasses condensation products (oligomer) having branched, cyclic and three-dimensional structures in addition to those having a chain structure.

In the formula (III), p is preferably an integer of 2 to 10, more preferably an integer of 3 to 7, further preferably an integer of 3 to 5. If a value p is decreased, a boiling point of the condensation product is lowered. For example, when a coating film is baked, there is a tendency that the condensation product is easily evaporated and is difficult to be incorporated in the coating film. From this point of view, it is preferable that the value p is an integer of 3 or more. On the contrary, if the value p exceeds 5, there is a tendency that a compatibility with a resin and a curing agent is lowered when making a coating, thus lowering a storage stability, lowering of an appearance of a coating film easily arises, a viscosity of the composition is increased and further the condensation product is difficult to be obtained industrially.

Examples of the condensation product (III) are, for instance, as follows.

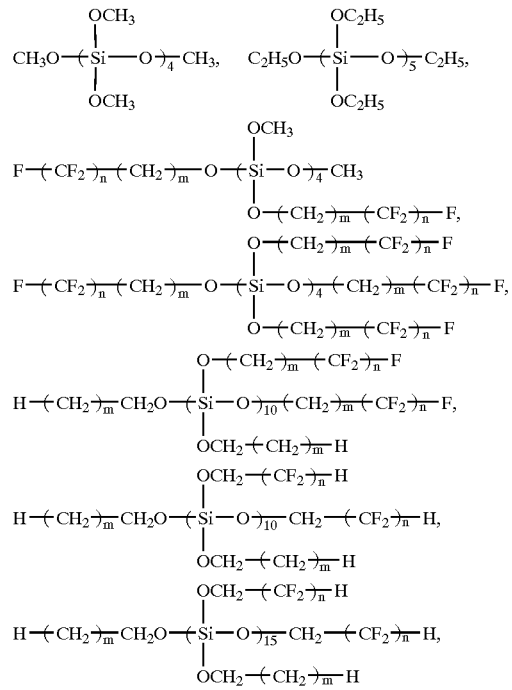

wherein m and n are as defined above. Among them, from the viewpoint of surface concentrating property, hydrolyzability, releasing property and availability,

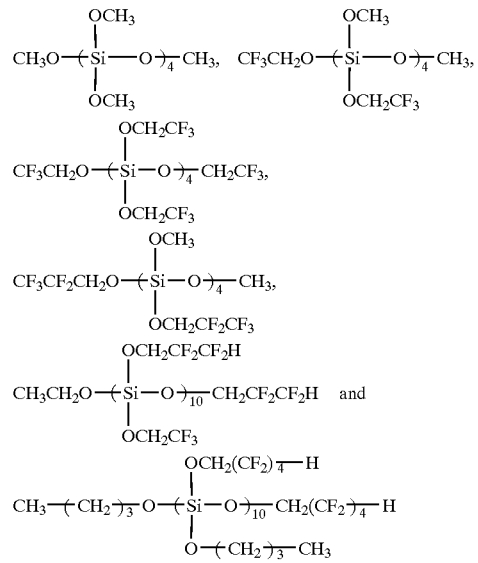

are preferable.

Also a condensation product (including a co-condensation product) of the trifunctional silicate compound (II) can be used. Further a co-condensation product of the tetrafunctional silicate compound (I) and trifunctional silicate compound (II) can be used. Examples of those (co)-condensation products are linear, branched, cyclic and three-dimensional condensation products.

A degree of condensation of the condensation products is preferably from 2 to 1,000, more preferably 3 to 100. When the degree of condensation decreases, since a boiling point of an oligomer or co-oligomer is lowered, the condensation product is easily evaporated at baking and is difficult to be incorporated into a coating film. When the degree of condensation exceeds 1,000, control of the degree of condensation becomes difficult at the time of synthesis and a viscosity of the condensation product is easily increased, and therefore workability tends to become inferior.

In the present invention, in case where the fluorine-containing resin (A) and/or other synthetic resin which are resin components have a crosslinkable functional group, it is preferable to add a curing agent (C).

The curing agent (C) may be optionally selected depending on kind of the crosslinkable functional group, crosslinking rate, melt-kneading temperature of a pigment and additives, film forming temperature by heat-melting, and the like. In conventional thermosetting powder coating compositions, selection of a curing agent is difficult from the viewpoint of compatibility, and therefore kind of a usable curing agent, particularly a combination thereof with a resin was limited. In the present invention, in case where a crosslinkable functional group is incorporated in the fluorine-containing resin (A), kind of a usable curing agent and combination thereof with a resin can be increased.

Examples of the usable curing agent (C) are, for instance, epoxy or glycidyl compounds, such as alicyclic epoxy resin, GMA acryl, aliphatic oxysilane, triglycidyl isocyanurate (TGIC), diglycidyl terephthalate, diglycidyl p-hydroxybenzoate, spiroglycol diglycidylether and hydantoin compounds; isophorone diisocyanate, tolylene diisocyanate, xylilene diisocyanate, 4,4'-diphenylmethane diisocyanate, hexamethylene diisocyanate, dimers thereof and blocked isocyanates obtained by blocking an isocyanate group of alcohol-modified polyisocyanate with a blocking agent (for example, ε-caprolactam, phenol, benzyl alcohol, methyl ethyl ketone oxime, etc.); curing agent of polybasic acid such as β-hydroxyalkylamide; polycarboxylic acids, e.g. aliphatic dibasic acids such as fumaric acid, succinic acid, adipic acid, azelaic acid, sebacic acid and dodecanedioic acid (DDA) and acid anhydrides such as phthalic anhydride, trimellitic anhydride and pyromellitic anhydride; tetramethoxymethylglycoluryl, isocyanate-modified silane coupling agent, and other curing agents described in JP-B-6-104792, JP-A-7-188587 and JP-A-1-103670. Thus a wide range of curing agents can be used.

Among them, preferred combinations of a curing agent with crosslinkable functional group in the composite resin particularly from the viewpoint of compatibility therewith are as follows.

(1) Crosslinkable functional group: Hydroxyl group
  Curing agent: Blocked isocyanate, polyurethodione
(2) Crosslinkable functional group: Carboxyl group
  Curing agent: Triglycidyl isocyanurate, β-hydroxyalkylamide, GMA acryl
(3) Crosslinkable functional group: Glycidyl group
  Curing agent: Aliphatic dibasic acids It is preferable that an amount of the curing agent (C) is from 0.1 to 1.2 equivalents, especially 0.5 to 1.0 equivalent to an amount of functional group contained in the fluorine-containing resin (A) or the fluorine-containing resin (A) and the other synthetic resin. When less than 0.1 equivalent, an effect of improvement by crosslinking in crack resistance at bending and impact resistance is not sufficient and water resistance is also lowered. When more than 1.2 equivalents, it results in lowering of appearance of a coating film.

In addition to the curing agent, a curing catalyst may be blended. Examples of the curing catalyst are, for instance, quaternary ammonium salts such as tetrabutylammonium chloride, tetrabutylammonium bromide and tetrabutylammonium iodide; quaternary phosphonium salts such as ethyltriphenylphosphonium acetate; phosphines such as triphenylphosphine; imidazoles such as 2-methylimidazole; organotin compounds such as dibutyltindilaurate and stannous octanoate; methyltolylsulfoneimide and stannous methanesulfonate, and the like. The curing catalyst may be blended in an amount of from about 0.1 part to about 3 parts to 100 parts of the fluorine-containing resin (A) or the fluorine-containing resin (A) and the other synthetic resin.

Since a coating film formed with the coating composition of the present invention is transparent, various kinds of pigments (D) can be blended. For example, there are organic pigments such as condensed azo compounds, isoindolinone, quinacridone, diketopyrrolopyrrole, anthraquinone, dioxazine and various organometal complexes; inorganic pigments such as titanium oxide (Preferred are one having rutile structure, and further preferable are alumina-treated, silica-treated or zirconia-treated titanium oxides), red iron oxide, yellow iron oxide, black iron oxide, carbon, chromium oxide, lead chromate, white lead and molybdenum orange; metal powders such as aluminum powder and stainless steel powder; extended pigments; and the like. Among them, inorganic pigments are preferred from the viewpoint of weather resistance which is one of the features of the present invention, particularly to maintain a gloss retention and to inhibit fading of color. A preferred content of the pigment is not more than 80 parts on the basis of 100 parts of the resin.

Examples of the extended pigment are, for instance, talc, silica, calcium carbonate, barium sulfate, mica, diatomaceous silica, asbestos, basic silicate, and the like.

In the present invention, in case where the silicate component (B) is in the form of liquid, in order to uniformly disperse the silicate component (B) in the powder coating composition in a short term dry-blending or melt-kneading step, it is preferable that silicate component in the liquid form is previously mixed to solid additives such as a pigment, curing agent and leveling agent, thus impregnating or adhering the liquid form silicate component in or to those additives. It is particularly preferable that the liquid form silicate component is impregnated in or adhered to the pigment since the impregnation and adhering can be carried out stably.

Examples of the liquid form silicate component (B) are the above-mentioned tetrafunctional silicate compound (I), trifunctional silicate compound (II) and condensation product or co-condensation products thereof which have a degree of condensation of not more than 10.

Particularly when the liquid form silicate component (B) is previously impregnated in a pigment, since the highly reactive silicate component is temporarily protected in the pigment, a side reaction with other components, for example, a curing agent in a step for preparing (kneading) a coating composition is inhibited and a storage stability of an obtained coating composition is enhanced, and as a result, a film forming property is enhanced. Examples of the suitable pigment which is impregnated with the liquid form silicate component and holds the silicate component are those having an oil absorption of not less than 8 g/100 g from the viewpoint of an ability of impregnating and holding the silicate component. It is preferable to previously remove adsorbed moisture from the pigment by means of drying by heating or mixing a dehydrating agent, thereby enabling stability of the silicate component to be increased. Examples of the dehydrating agent are, for instance, o-methyl formate, and the like.

In addition to those additives, to the powder coating composition of the present invention may be blended various additives usually added in the field of paints, in an amount not lowering an effect of the present invention. Examples of such other additives are a flow control agent, antioxidant, thermal deterioration preventing agent, ultraviolet ray absorber, foaming inhibiting agent, gloss control agent, defoaming agent, electric charge control agent, antistatic agent, and the like in addition to the above-mentioned pigments.

Examples of the flow control agent are, for instance, acrylate polymers such as polylauryl acrylate, polybutyl acrylate and poly-2-ethylhexyl acrylate; ester of polyethylene glycol and perfluorocarboxylic acid and fluorine-containing polymers having a low melting point such as VdF/TFE/HFP copolymer (excluding VdF polymers having crosslinkable functional group); silicone polymers such as polydimethylsiloxane and polymethylphenylsiloxane; and the like.

Then the process for preparing the powder coating composition of the present invention is explained below. One of the features of the composition of the present invention is such that a conventional preparation process of powder coating composition including a pulverizing step at room temperature can be used as it is.

The preparation process comprises the basic steps such as a pre-pulverizing step, dry blending step, melt-kneading step, pulverizing step and classifying step.

(Pre-pulverizing Step)

The fluorine-containing resin (A) and other synthetic resin are obtained in various forms such as pellet, seed polymer powder, bulk and pulverized polymer. In order to obtain good mixing in the following dry blending step, the resins are formed into pellets of not more than 5 mm or pulverized into an average particle size of from about 50 $\mu$m to about 100 $\mu$m. In case of using the other synthetic resin, the fluorine-containing resin (A) and other synthetic resin may be previously melt-mixed and the melt-mixed composite resin may be pulverized. The pre-pulverizing can be carried out at a temperature in a range of from –100° C. to room temperature.

(Dry Blending Step)

The resin components in the form of powder or pellet, silicate compound (B), and as case demands, a curing agent, curing catalyst, pigment and the above-mentioned other additives are dry-blended. A mixer to be used is usually a high speed mixer, low speed mixer or Henschel mixer. When the crosslinkable functional group is introduced, if a temperature inside the mixer is elevated too high, a reaction of the crosslinkable functional group with the curing agent advances. Therefore it is preferable that the temperature inside the mixer is maintained at a temperature of about 80° C. or lower by controlling time and mixer temperature.

In case of blending a pigment, the mixing is carried out so that the silicate compound (B) sufficiently adheres to and is impregnated to the pigment. For example, the pigment and the silicate component may be mixed previously.

(Melt-kneading Step)

The above-mentioned dry-blended product is put in a melt-kneader, melted at a temperature of not less than a melting point or Tg of the resin component to knead sufficiently, and then extruded in the form of sheet. In that case, an extruder which is high in productivity in continuous production is used preferably. Examples of usual melt-kneader are a single screw extruding kneader, twin-screw extruding kneader, heating kneader and heating roll. A melt-kneading temperature and time are from 80° to 120° C. and several tens of seconds, respectively so that the reaction of the functional group in the resin and the curing agent does not advance too much.

(Pulverizing Step)

The melt-extruded sheet is roughly pulverized and then finely pulverized. The sheet melt-extruded in a specified form is, after cooling and solidifying, roughly pulverized into chips of from about 5 mm to about 15 mm and then finely pulverized at room temperature. In that case, it is preferable that the pulverizer is maintained at a constant temperature with air-cooling or water-cooling means. The temperature is maintained preferably in the range of from about 5° C. to about 40° C. As the pulverizer, a high speed impact pulverizer, high speed pin type pulverizer, or the like is used preferably.

(Classifying Step)

The finely pulverized powder is classified with a centrifugal classifier, blower type sieving machine, sieve shaking machine, or the like. A narrow particle size distribution is preferable. It is preferable that an average particle size of the powder coating composition is from 1 to 100 $\mu$m, especially 10 to 50 $\mu$m. When less than 1 $\mu$m, it is difficult to control a coating thickness because the particles are subject to electrostatic repulsion, and there occur problems with lowering of a coating efficiency due to lowering of collecting efficiency with a cyclone in case of recycling and also lowering of safety workability due to permeation through a protection mask. When more than 100 $\mu$m, leveling property is lowered, thereby causing problems that appearance of a coating film becomes poor and a thin coating cannot be obtained. An average particle size is determined by a desired coating thickness. For example, in case of a coating thickness of from about 40 $\mu$m to about 50 $\mu$m, the average particle size is preferably from 25 to 30 $\mu$m. The smaller the average particle size is, the more the appearance of coating film is enhanced, and coating thin is possible, but a blockage occurs at spray-coating, thereby causing lowering of workability and adhesion of a coating.

The powder coating composition of the present invention can be prepared in such a manner mentioned above.

Since the powder coating composition of the present invention contains the silicate component (B), electrostatic charge of the fluorine-containing resin (A) can be removed at the dry-blending step, pulverizing step and classification step, thus enhancing handling property of the powder.

The powder coating composition of the present invention can be coated on various substrates by known applying methods. Then the coating film obtained by baking the coated film is excellent in appearance such as smoothness and gloss, mechanical properties such as surface hardness, flexibility and impact resistance, adhesion to a substrate, weather resistance, stain-proofing property and water resistance.

Namely the present invention relates to the coated article obtained by coating the above-mentioned powder coating composition on a substrate and then baking it for curing.

For coating, known coating methods can be employed. For example, there are an electrostatic powder coating method such as electrostatic powder spray coating method, fluid bed coating method, electrostatic dip coating method, and the like. A coating thickness is usually in the range of from 20 to 100 μm. Particularly in case of electrostatic powder coating method, since charge of the powder has been removed, coating thick is possible.

Then the coating film is baked. A baking temperature is not more than 200° C., usually not less than 150° C., preferably 160° to 200° C. A baking time is from 10 to 30 minutes, usually 15 to 20 minutes. At that baking temperature, the powder coating composition of the present invention exhibits excellent flowability and gives a smooth and uniform baked coating film.

The powder coating composition of the present invention is also excellent in adhesion to a substrate. The preferable substrate is one which has electric conductivity. Examples thereof are, for instance, various metal plates such as stainless steel plate, aluminum plate, steel plate and galvanized steel plate, and in addition, heat resistant engineering plastics such as polycarbonate, polyphenylene oxide, polyethylene terephthalate, polyether sulfone, polyamideimide and polyether ether ketone which are endowed with electric conductivity by dispersing a conductive carbon. It is preferable that those substrates are subjected to removal of rust by sand blasting or acid washing, baking, degreasing by washing with a solvent, with emulsion type cleaner or alkali, phosphating with zinc phosphate, calcium phosphate or iron phosphate, or chemical conversion treatment such as chromate treatment, alumite treatment or chromium phosphate treatment. In that case, though the coating composition of the present invention has enough adhesion to those substrates, in compliance with purpose, it is possible to carry out intermediate coating of zinc rich rust-preventive primer or various primers such as an epoxy resin and acrylic resin together. Those intermediate coatings may be applied in any form of solvent type coating, aqueous coating, powder coating or the like. It is preferable to apply in the form of powder coating in consideration of workability in the present invention.

The coated article of the present invention is used for various applications. Non-restricted examples of the application are, for instance, applications described in "Handbook of Powder Coating Technique" edited by Nippon Funtai Toso Kogyo Kyokai (1994), pp 169 to 173 such as construction and building material, communication device, vehicles, road materials, water and gas service materials, metal products, domestic appliances, machines, tools, measuring instruments, medical instruments, utensils for maintenance, agricultural materials, ships, sports and leisure products, and the like.

Then the present invention is explained by means of examples, but is not limited to them.

Preparation Example 1

A 4-liter pressure resistant reactor equipped with a stirrer was charged with 1,000 ml of deionized water, and feeding of pressurized nitrogen and deaeration were repeated to remove dissolved oxygen. Then the reactor was charged with 407 g of chlorofluoroethane (HCFC-141b), 3 g of hydroxybutyl vinyl ether (HBVE) and 794 g of hexafluoropropane (HFP) successively. A pressure inside the reactor was increased up to 12 kgf/cm$^2$ at 35° C. with a monomer mixture of tetrafluoroethylene (TFE)/ethylene (ET) in a % by mole ratio of 82/18. Then the reactor was charged with 2 g of cyclohexane and 24 g of 25% isobutyryl peroxide solution of HCFC-225, and the above-mentioned monomer mixture was supplied continuously so that the inside pressure became constant at 12 kgf/cm$^2$. Every three hours after starting of the reaction, 4 g of 25% isobutyryl peroxide solution of HCFC-225 and 2 g of HBVE were additionally added three times. After 12-hour reaction, the inside of the reactor was restored to normal temperature and normal pressure to terminate the reaction. After the obtained solid was washed and dehydrated, it was vacuum-dried at 80° C. to give 165 g of TFE/HFP/ET/HBVE copolymer (white powder). Polymer components, melting point (Tm), glass transition temperature (Tg), MFR, solubility in THF and number average molecular weight (Mn) of the obtained fluorine-containing copolymer were measured by the methods mentioned below.

Melting point, glass transition temperature: A heat balance of 10 mg of fluorine-containing copolymer was measured at a heat-up speed of 10° C./min in a temperature range of −25° C. to 200° C. by using Thermal Analysis System (available from Perkin Elmer Co., Ltd.), and a top peak was assumed to be a melting point. Since the glass transition temperature (Tg) was detected as two variable polar points, it was obtained by a center point method.

MFR: Measurement was carried out under the conditions of 130° C., a load of 2.1 kg and 10 minutes. In case of large flowing amount, a flowing time of 20 g resin was measured and converted to an amount of resin flowing for 10 minutes.

Solubility in THF: 0.5 Gram of resin powder was put in 10 ml of THF at room temperature, and after allowing to stand for 72 hours, a solubility was observed with naked eyes.

Number average molecular weight: A styrene-based molecular weight was measured by using THF solution of 0.5% by weight of fluorine-containing copolymer and passing through Column TSKgel G4000XL (available from Toso Kabushiki Kaisha) at a flow rate of carrier (THF) of 1.0 ml/min.

The results are shown in Table 1.

Preparation Example 2

A 1-liter pressure resistant reactor equipped with a stirrer was charged with 250 ml of deionized water, and feeding of pressurized nitrogen and deaeration were repeated to remove dissolved oxygen. Then the reactor was charged with 196 g of chlorofluoroethane (HCFC-141b). A pressure inside the reactor was increased up to 10 kg/cm$^2$ at 45° C. with a monomer mixture of VdF/TFE/HFP in a % by mole ratio of 80.5/16.6/2.9. Then the reactor was charged with 4.9 g of ethyl acetate (EtOAc) and 2.5 g of 40% tetrafluoropropanol solution of diisopropyl peroxycarbonate (IPP), and the above-mentioned monomer mixture was supplied continuously so that the inside pressure became constant at 10 kg/cm$^2$. After 5.6-hour reaction, the inside of the reactor was restored to normal temperature and normal pressure to terminate the reaction. After the obtained solid was washed and dehydrated, it was vacuum-dried at 80° C. to give 75 g of fluorine-containing copolymer. A melting point, glass transition temperature (Tg), MFR, solubility in THF and number average molecular weight (Mn) of the obtained fluorine-containing copolymer were measured in the same manner as in Preparation Example 1.

The results are shown in Table 1.

Preparation Example 3

A 1-liter four-necked flask equipped with a stirring blade, cooling tube and thermometer was charged with 300 ml of methanol, 60 g of hydroxyethyl methacrylate (HEMA) and 1.2 g of n-lauryl mercaptan. When a temperature of the mixture reached 60° C. in nitrogen stream in a warm bath and 2.5 ml of 40% aqueous toluene solution of IPP was added, generation of heat arose and refluxing of methanol started. Subsequently a mixture of 140 g of methyl methacrylate (MMA) and 2.8 g of n-lauryl mercaptan was added dropwise over one hour. With advance of polymerization, precipitation of polymerization product occurred in the form of white particle. Two hours after starting of the reaction, a reaction system was cooled and a product in the system was dispersed in water to give an aqueous dispersion. A solid content of the obtained aqueous dispersion was collected by filtrating through a glass filter and after washing and dehydrating, vacuum-dried at 80° C. to give 192 g of MMA polymer (white powder).

A melting point (Tm), glass transition temperature (Tg), MFR, solubility in THF and number average molecular weight (Mn) of the obtained MMA copolymer were measured by the above-mentioned methods.

The results are shown in Table 1.

TABLE 1

|  | Prep. Ex. 1 | Prep. Ex. 2 | Prep. Ex. 3 |
|---|---|---|---|
| Polymer components (% by mole) |  |  |  |
| TFE | 34 | 16 | — |
| HFP | 16 | 3 | — |
| VdF | — | 81 | — |
| ET | 47 | — | — |
| HBVE | 3 | — | — |
| MMA | — | — | 85 |
| HEMA | — | — | 15 |
| Physical properties of polymer |  |  |  |
| Glass transition temperature Tg (° C.) | 38 | 5 | 91 |
| Melting point Tm (° C.) | 125 | 110 | — |
| MFR (g/10 min) | 56 | 120 | 152 |
| Solubility in THF | Insoluble | Soluble | Soluble |
| Number average molecular weight ($\overline{Mn}$) | Un-measurable* | 10000 | 8200 |

*: Un-measurable because of being insoluble in THF.

EXAMPLE 1

100 Parts of pellets of fluorine-containing resin (A) obtained in Preparation Example 1, 5.4 parts of B1530 (available from Hüls Co., Ltd.) as the curing agent (C) and 10 parts of ETHYL SILICATE 48 (Tetraethoxysilane condensation product available from Colcoat Co., Ltd., degree of condensation=4) were dry-blended in a mortar. This condensation product was kneaded by using a twin-screw extruder (LABOPLASTOMIL available from Toyo Seiki Seisakusho Kabushiki Kaisha) at 100° C. of cylinder temperature for 10 minutes to give a kneaded product. The kneaded product was pulverized at room temperature (at 20° C.) for five minutes with Micro Hammer Mill (available from IKA Co., Ltd.). The obtained powder was passed through a 200 mesh screen for classification to give a fluorine-containing resin powder coating composition having an average particle size of 50 µm. In any of the dry-blending step, pulverizing step and classification step of the above-mentioned preparation process, lowering of handling property of the powder due to electrostatic charging was not recognized. With respect to the fluorine-containing resin powder coating composition, the following measurements were carried out. The results are shown in Table 2.

(Film Forming Property)

The powder coating composition is coated on an aluminum plate of AM712 subjected to chemical conversion treatment specified in JIS H4000 at an applied voltage of 60 kV by using a corona discharge type powder coating gun (GX3300 available from Onoda Cement Kabushiki Kaisha), and then immediately baking is carried out at 200° C. for 10 minutes, followed by air cooling to room temperature to give a coated plate. The film forming property is evaluated by emitting fluorescent light to the coated plate and observing a shape of the light reflected on the surface of the coating film with naked eyes.

A: No deformation on the shape of light.
B: Slight deformation on the shape of light.
C: Great deformation on the shape of light.

(Coating Thickness)

Coating thickness is measured with an eddy-current instrument EL10D for measuring a coating thickness (available from Kabushiki Kaisha Sanko Denshi Kenkyusho).

(Adhesion)

A cross cut test for adhesion is carried out according to AAMA605.

(Gloss)

A specular gloss at an angle of 60 degrees is measured according to JIS K 5400-6.7.

(Water Contact Angle)

A static contact angle of water on the coated plate produced in the same manner as in the above-mentioned test for film forming property is measured with a contact angle meter (available from Kyowa Kagaku Kabushiki Kaisha). The coated plate is exposed at an angle of 30 degrees in a southern direction on a roof of research building at Yodogawa-seisakusho of DAIKIN INDUSTRIES, LTD. in Settsu-shi of Osaka Prefecture for one week and then washed with flowing water. A water contact angle after the exposure is measured in the same manner as above.

(Stain After Exposure)

With respect to the coated plate produced in the same manner as in the above-mentioned test for film forming property, a L value is measured by using DP300 available from Minolta Co., Ltd. and is assumed to be an initial value. After the coated plate is exposed at an angle of 30 degrees in a southern direction on a roof of research building at Yodogawa-seisakusho of DAIKIN INDUSTRIES, LTD. in Settsu-shi of Osaka Prefecture for two months, a L value is measured again. The difference ΔL is classified and evaluated as follows.

A: ΔL≦3
B: 3<ΔL≦5
C: 5<ΔL≦10
D: 10<ΔL (Accelerated Weather Resistance)

An accelerated weather resistance test is carried out for 1,000 hours with EYESUPER UV tester available from Iwasaki Electric Co., Ltd. by using the coated plate produced in the same manner as in the above-mentioned test for film forming property and a gloss is measured. A gloss retention G.R. to an initial gloss is calculated by the following equation $$G.R.(\%)=(\text{Gloss 1,000 hours after}/\text{Initial gloss})\times 100$$

The results are classified and evaluated as follows.

○: G.R.≧80%
Δ: 80%>G.R.≧50%
×: 50%>G.R.

Also with respect to an appearance such as cracking, blistering and staining are checked with naked eyes.
(Pencil Hardness)
A pencil hardness is measured according to JIS K 5400.

EXAMPLE 2

A fluorine-containing resin powder coating composition was prepared in the same manner as in Example 1 except that ETHYL SILICATE 48 was previously impregnated in 42 parts of Tipaque CR97 (titanium oxide available from Ishihara Sangyo Kabushiki Kaisha, oil absorption: 15 g/100 g) before dry blending. Evaluations of the prepared composition were carried out in the same manner as in Example 1. The results are shown in Table 2.

EXAMPLE 3

A fluorine-containing resin powder coating composition was prepared in the same manner as in Example 1 except that a composite resin comprising 70 parts of the fluorine-containing resin prepared in Preparation Example 2 and 30 parts of the resin prepared in Preparation Example 3 was used instead of 100 parts of the fluorine-containing resin (A) prepared in Example 1. Evaluations of the prepared composition were carried out in the same manner as in Example 1. The results are shown in Table 2.

EXAMPLE 4

A fluorine-containing resin powder coating composition was prepared in the same manner as in Example 3 except that ETHYL SILICATE 48 was previously impregnated in 42 parts of Tipaque CR97 before dry blending. Evaluations of the prepared composition were carried out in the same manner as in Example 1. The results are shown in Table 2.

EXAMPLES 5 AND 6

Fluorine-containing resin powder coating compositions were prepared in the same manner as in Example 1 except that a fluorinated silicate prepared by replacing hydrogen atoms of ETHYL SILICATE 48 used in Examples 1 and 2 with fluorine atoms was used. Evaluations of the prepared compositions were carried out in the same manner as in Example 1. The results are shown in Table 2.

EXAMPLE 7

A fluorine-containing resin powder coating composition was prepared in the same manner as in Example 2 except that Tipaque CR97 and ETHYL SILICATE were added simultaneously at dry-blending. Evaluations of the prepared composition were carried out in the same manner as in Example 1. The results are shown in Table 2.

Comparative Examples 1 to 4

Fluorine-containing resin powder coating compositions were prepared in the same manner as in Examples 1 to 4, respectively except that ETHYL SILICATE 48 was not added. Evaluations of the prepared composition were carried out in the same manner as in Example 1. The results are shown in Table 2.

TABLE 2

| | Example | | | |
|---|---|---|---|---|
| | 1 | 2 | 3 | 4 |
| Components of coating composition | | | | |
| Fluorine-containing resin (part by weight) | | | | |
| Preparation Example 1 | 100 | 100 | — | — |
| Preparation Example 2 | — | — | 70 | 70 |
| Preparation Example 3 | — | — | 30 | 30 |
| Curing agent (part by weight) | 5.4 | 5.4 | — | — |
| Titanium oxide (part by weight) | — | 42 | — | 42 |
| Silicate compound (part by weight) | | | | |
| ETHYL SILICATE 48 | 10 | 10 | 10 | 10 |
| Fluorine-substituted silicate | — | — | — | — |
| Adding method of silicate | Added at dry-blending | Impregnated in pigment | Added at dry-blending | Impregnated in pigment |
| Evaluation of coating film | | | | |
| Film forming property | B | A | B | A |
| Coating thickness (μm) | 40 | 40 | 40 | 40 |
| Adhesive property | ○ | ○ | ○ | ○ |
| Gloss | 65 | 65 | 70 | 70 |
| Water contact angle (degree) | | | | |
| Initial | 99.0 | 95.5 | 83.0 | 83.0 |
| One week after exposure | 72.7 | 68.6 | 47.4 | 40.0 |
| Stain after exposure | A | A | A | A |
| Accelerated weather resistance | | | | |
| Gloss retention (G.R.) | ○ | ○ | ○ | ○ |
| Appearance | ○ | ○ | ○ | ○ |
| Pencil hardness | 2B | 2B | H | H |

TABLE 2-continued

|  | Example | | | Comparative Example | | | |
| --- | --- | --- | --- | --- | --- | --- | --- |
|  | 5 | 6 | 7 | 1 | 2 | 3 | 4 |
| Components of coating composition | | | | | | | |
| Fluorine-containing resin (part by weight) | | | | | | | |
| Preparation Example 1 | 100 | 100 | 100 | 100 | 100 | — | — |
| Preparation Example 2 | — | — | — | — | — | 70 | 70 |
| Preparation Example 3 | — | — | — | — | — | 30 | 30 |
| Curing agent (part by weight) | 5.4 | 5.4 | 5.4 | 5.4 | 5.4 | — | — |
| Titanium oxide (part by weight) | — | 42 | 42 | — | 42 | — | 42 |
| Silicate compound (part by weight) | | | | | | | |
| ETHYL SILICATE 48 | — | — | 10 | — | — | — | — |
| Fluorine-substituted silicate | 10 | 10 | — | — | — | — | — |
| Adding method of silicate | Added at dry-blending | Impregnated in pigment | Added at dry-blending | — | — | — | — |
| Evaluation of coating film | | | | | | | |
| Film forming property | B | A | B | A | A | A | A |
| Coating thickness (μm) | 40 | 40 | 40 | 40 | 40 | 40 | 40 |
| Adhesive property | ○ | ○ | ○ | ○ | ○ | ○ | ○ |
| Gloss | 72 | 73 | 65 | 65 | 65 | 63 | 63 |
| Water contact angle (degree) | | | | | | | |
| Initial | 99.0 | 99.0 | 98.0 | 99.5 | 95.5 | 83.6 | 83.5 |
| One week after exposure | 66.0 | 59.1 | 69.0 | 99.5 | 95.5 | 83.6 | 83.5 |
| Stain after exposure | A | A | A | C | C | B | B |
| Accelerated weather resistance | | | | | | | |
| Gloss retention (G.R.) | ○ | ○ | ○ | ○ | ○ | ○ | ○ |
| Appearance | ○ | ○ | ○ | ○ | ○ | ○ | ○ |
| Pencil hardness | F | F | 2B | 3B | 4B | F | F |

INDUSTRIAL APPLICABILITY

The fluorine-containing resin powder coating composition of the present invention can make handling of a powder easy in a preparation process thereof, particularly can reduce electrostatic charge attributable to the fluorine-containing resin, can make a coating film thick at electrostatic coating and gives a coating film having a high hardness. Adherence of stain to the coating film can be prevented and removal of stain is easy.

What is claimed is:

1. A fluorine-containing resin powder coating composition which comprises a fluorine-containing resin (A), a silicate component (B) and a pigment (D); said silicate component (B) is contained in an amount of 1 to 40 parts by weight based on 100 parts of the fluorine-containing resin (A) and is at least one selected from the group consisting of a tetrafunctional silicate compound represented by the formula (I):

$$Si(OR)_4 \quad (I)$$

wherein R is the same or different and each is an organic group having 1 to 16 carbon atoms, or a condensation product thereof, a trifunctional silicate compound represented by the formula (II):

$$R^2Si(OR^1)_3 \quad (II)$$

wherein $R^1$ is the same or different and each is an organic group having 1 to 16 carbon atoms, $R^2$ is hydrogen atom or an organic group having 1 to 16 carbon atoms, or a condensation product thereof and a co-condensation product of the tetrafunctional silicate compound represented by the formula (I) and trifunctional silicate compound represented by the formula (II); and said silicate compound (B) is previously impregnated in the pigment (D).

2. The powder coating composition of claim 1, wherein the fluorine-containing resin (A) has a crosslinkable functional group and the powder coating composition further comprises a curing agent (C).

3. The powder coating composition of claim 1, wherein a fluorine content of the fluorine-containing resin (A) is not less than 10% by weight.

4. The powder coating composition of claim 1, wherein the silicate component (B) is a condensation product (including a co-condensation product) having a degree of condensation of not less than 3.

5. A process for preparing the powder coating composition of claim 1, wherein pulverization is carried out after the silicate component (B) is previously impregnated in the pigment (D) and melt-kneaded with the fluorine-containing resin and curing agent.

6. A coated article obtained by applying the powder coating composition of claim 1 on a substrate and baking.

* * * * *